United States Patent [19]

Sandstrom et al.

[11] Patent Number: 5,114,582
[45] Date of Patent: May 19, 1992

[54] FILTER ELEMENT AND SPIRAL-WOUND MEMBRANE CARTRIDGE CONTAINING SAME

[75] Inventors: Eric L. Sandstrom, Kensington, N.H.; Alfred Prokop, North Andover, Mass.; William H. Young, II, East Kingston, N.H.; Anthony M. D'Urso, Bradford, Mass.

[73] Assignee: W. R. Grace & Co.-Conn., New York, N.Y.

[21] Appl. No.: 684,704

[22] Filed: Apr. 12, 1991

[51] Int. Cl.⁵ .............................................. B01D 63/00
[52] U.S. Cl. ......................... 210/321.74; 210/321.83; 210/433.1; 210/437; 210/457; 210/493.4
[58] Field of Search ............. 210/321.61, 321.74, 210/321.83, 321.76, 497.1, 437, 457, 494.1, 493.4, 433.1; 264/285, 339; 156/184, 187, 446

[56] References Cited

U.S. PATENT DOCUMENTS

| | | | |
|---|---|---|---|
| 3,966,616 | 6/1976 | Bray | 210/433 M |
| 4,059,530 | 11/1977 | Luppi | 210/321 B |
| 4,137,113 | 1/1979 | Kanamary et al. | 156/187 |
| 4,184,962 | 1/1980 | Oscarsson et al. | 210/232 |
| 4,197,206 | 4/1980 | Karn | 210/321 A |
| 4,225,413 | 9/1980 | Karn | 204/301 |
| 4,235,723 | 11/1980 | Bartlett, Jr. | 210/321 R |
| 4,277,340 | 7/1981 | Kanamaru et al. | 210/433.2 |
| 4,284,492 | 8/1981 | Karn | 204/299 R |
| 4,475,973 | 10/1984 | Tanaka et al. | 156/184 |
| 4,765,893 | 8/1988 | Kohlheb | 210/315 |
| 4,842,736 | 6/1989 | Bray et al. | 210/321.74 |
| 4,855,058 | 8/1989 | Holland et al. | 210/321.74 |
| 4,902,417 | 2/1990 | Lein | 210/321.74 |
| 4,938,869 | 4/1990 | Bayerlein et al. | 210/437 |
| 4,944,877 | 7/1990 | Maples | 210/321.74 |
| 4,952,313 | 8/1990 | Skaletz | 210/321.76 |

FOREIGN PATENT DOCUMENTS 1223823  7/1987  Canada ..................... 182/13

Primary Examiner—Robert A. Dawson
Assistant Examiner—Ana Fortuna
Attorney, Agent, or Firm—Celia H. Ketley; Chester Cekala; William L. Baker

[57] ABSTRACT

An improved spiral membrane cartridge is provided, comprising one or more filter elements, spirally wound on a cylindrical permeate transport tube. Each filter element comprises a heat-sealed membrane element and a feed spacer. The spiral membrane cartridge of the invention contains no adhesives, improving the reliability and durability of the cartridge. The invention further provides a method for making such an improved membrane cartridge, and the membrane elements used therein.

12 Claims, 6 Drawing Sheets

FILTER ELEMENT AND SPIRAL-WOUND MEMBRANE CARTRIDGE CONTAINING SAME

BACKGROUND OF THE INVENTION

The present invention relates to spiral-wound membrane cartridges, to a filter element which may be used in such cartridges, and to a method of manufacturing such cartridges without any adhesive being present in the finished cartridge. More particularly, the invention relates to a spiral membrane cartridge comprising a cylindrical permeate transport tube having a plurality of axial ports, and one or more filter elements spirally wound on the transport tube, each filter element comprising a membrane element and a feed spacer. Each membrane element comprises a permeate carrier layer interposed between a pair of membranes, e.g. semipermeable membranes, which have a heat sealable backing layer, and which are heat sealed around their periphery.

Filtration devices which contain semi-permeable membranes are used to effect liquid separations in a wide variety of applications, such as water purification, concentration of dilute mixtures or solutions, and waste treatment and/or recovery of recyclable components.

Spiral-wound membrane cartridges allow efficient filtration in such applications, by advantageously providing a large membrane surface area within a relatively small spatial volume. Spiral-wound filter cartridges are described, for example, in U.S. Pat. No. 4,902,417, the disclosure of which is incorporated herein by reference. Conventional spiral membrane cartridges are manufactured by running a bead of adhesive along the edge of a pair of flat membranes having a permeate carrier layer disposed therebetween to form a membrane element, wrapping a plurality of these membrane elements, with feed spacers interposed between the elements, in a spiral configuration, and heating the cartridge to cure the adhesive and thus seal the edges of the membrane elements. The outside of the cartridge is then typically wrapped with an adhesive tape, or otherwise secured to keep the elements from unwinding, i.e. maintain the cartridge in a spiral configuration.

One disadvantage to such conventional spiral membrane cartridges is that the use of adhesives in their manufacture reduces their usefulness in applications which involve the filtration of solvents and/or other harsh solutions. Such solvent and solutions cause degradation of the adhesives in the membrane cartridge, resulting in contamination of the retentate and/or permeate, which is particularly deleterious in pharmaceutical and biomedical applications. Breakdown of the adhesive may further result in eventual failure of the cartridge.

Additionally, the process used in the manufacture of such cartridges involves assembling the entire cartridge at once and then testing it for integrity. This necessarily means that if a single element of the device is faulty, or if there is a problem with fabrication of the cartridge, the entire device will fail the final testing. Since the cartridge cannot be disassembled after the adhesive is cured, defective cartridges must be discarded. Manufacturing is thus far less economical than it would be if each element could be tested individually prior to assembly, and defective elements discarded rather than entire assemblies. Furthermore, it would be advantageous if finished cartridges could readily be disassembled to effect repairs.

Thus it has been desired in the filtration art to provide a spiral membrane cartridge which would be highly chemically resistant, thus having good reliability over long periods of time in severe applications. It has further been desired to provide such a cartridge which is simple and economical to manufacture, and can be assembled and disassembled element-by-element.

SUMMARY OF THE INVENTION

The problems of the prior art, described above, have been overcome by the membrane cartridge of the invention. A novel process has been found, by which a spiral membrane cartridge may be produced by the production of a number of individual heat sealed elements, which may then be individually tested for integrity and assembled to form a final cartridge which is free of adhesives and may be readily disassembled for repair by replacement of defective elements.

The present invention thus relates to a spiral membrane cartridge produced by such a process, to the individual heat sealed membrane elements utilized in the cartridge, and to a novel method of manufacturing these membrane elements. In the cartridge of the invention, each membrane element is paired with a feed spacer to form a filter element.

To form the spiral-wound membrane cartridge of the invention, one or more filter elements of the invention are spirally wound about a permeate transport tube having a plurality of axial apertures. Each filter element is disposed such that the membrane element is in fluid communication with the permeate transport tube, and the feed spacer is retained in a position such that fluid is able to flow through the spiral, i.e. between the windings of the membrane element(s).

Each membrane element comprises a first membrane having a membrane surface and a heat-sealable backing surface with at least one permeate port heat sealed thereto, a second membrane having a membrane surface and a heat-sealable backing surface, and a permeate carrier layer interposed between the backing surfaces of the first and second membranes, wherein the first and second membranes are heat-sealed to each other around their entire periphery.

Fluid communication between each membrane element and the permeate transport tube is established by inserting the permeate port which is heat sealed to one of the membranes of the membrane element into one of the axial apertures in the transport tube. The feed spacer is preferably disposed immediately adjacent the transport tube, such that each permeate port can be inserted through an aperture in the feed spacer, retaining the feed spacer in an advantageous position. However, the feed spacer may be positioned and retained differently, as long as fluid is able to flow through the spiral via the feed spacer.

After winding the filter elements(s) into a spiral configuration, a sleeve element or other retaining means is employed to retain the cartridge in the spiral configuration.

In its method aspects, the invention relates to a method of forming an individual heat sealed membrane element comprising the steps of:

a) providing a first membrane, having a membrane surface and a heat-sealable backing surface with a permeate port heat-sealed thereto, and a second membrane, having a membrane surface and a heat-sealable backing surface;

b) interposing a permeate carrier layer between the backing surfaces of the first and second membranes to form a membrane/carrier assembly;

c) winding the membrane/carrier assembly, together with a temporary spacer element, into a spiral configuration, wherein said spacer element has a thickness such that the radius of curvature of the assembly will be the same as that of the membrane element when it is wound in a spiral membrane cartridge;

d) temporarily bonding the edges of the wound membrane/carrier assembly;

e) incrementally unwinding the bonded membrane/carrier assembly, while drawing the temporarily bonded edges through a heat-sealing means, to heat seal the assembly inside the temporarily bonded edge; and f) removing the temporarily bonded edge.

At some point in the above process, or before using the element, the two width-wise ends of the membrane element are heat-sealed, such that the periphery of the membranes are completely sealed around the permeate carrier layer.

The invention further relates to a method of forming a spiral membrane cartridge comprising the steps of providing one or more membrane elements, as described above; providing a feed spacer, disposed such that fluid will be able to flow through the wound spiral; establishing fluid communication between the permeate carrier layer of the membrane element and the permeate transport tube; spirally winding the membrane elements and feed spacers around the permeate transport tube to form a spirally wound cartridge; and providing a retaining means to retain the wound cartridge in the spiral configuration.

In a preferred method, each feed spacer is disposed immediately adjacent the cylindrical permeate transport tube, and a permeate port is inserted through the feed spacer into an aperture in the transport tube, such that the feed spacer is retained in an advantageous position to aid fluid flow.

Preferred embodiments of the articles and method of the invention will be explained in further detail hereinbelow with reference to the drawings.

DETAILED DESCRIPTION OF THE INVENTION

Figure 1:
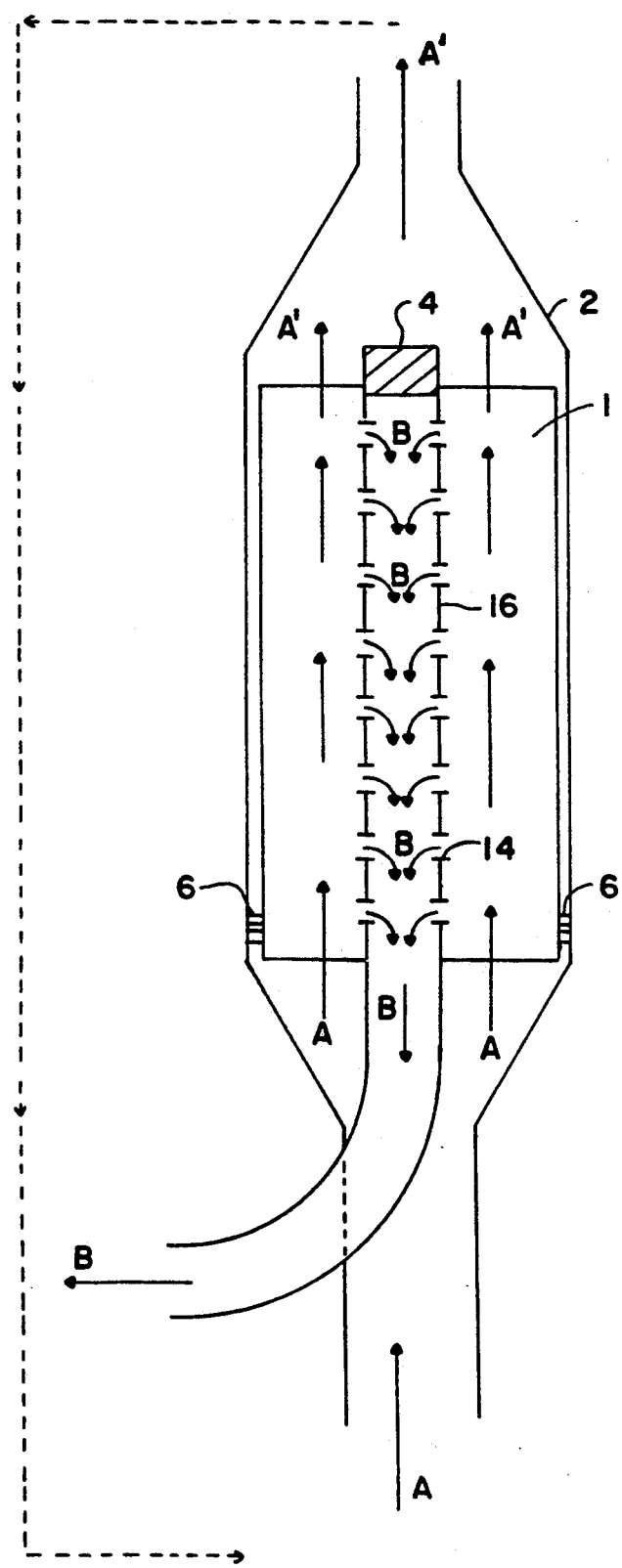
FIG. 1 shows a schematic cross-sectional side view of a filtration apparatus containing a spiral-wound membrane cartridge of the invention.

The preferred embodiments of the invention will be discussed in detail below, with reference to the drawings, throughout which like reference numerals indicate like parts.

FIG. 1 shows a schematic cross-sectional front view of a filtration apparatus in which the spiral wound membrane cartridge of the invention could be used. The cartridge of the invention is also suitable for use in other filtration devices, e.g. those used for electrodialysis or liquid-liquid membrane extraction. In the apparatus of FIG. 1, a spiral cartridge 1 (details of which are omitted for clarity) is disposed within outer housing 2. Arrows marked A, A', and B indicate the fluid flow path through the apparatus. The process stream, or feed, enters and flows through the apparatus as shown by arrows A. Side plugs 6 prevent the feed from flowing around the spiral cartridge, and direct it instead into the cartridge. The individual membrane elements within the cartridge are all sealed around their edges, so that the feed flows into the cartridge via channels formed by the feed spacers. As the feed flows through the apparatus and past the membrane surfaces, feed which is able to pass through the membrane (permeate, designated by arrows B) does so, and is carried by the permeate carrier layer to the permeate ports 14. The permeate then runs into and down the permeate transport tube 16 and out of the apparatus. (Plug 4 prevents the permeate from leaking through the top of the tube). Meanwhile, feed which is unable to pass through the membrane (retentate) passes on through the channels, becoming increasingly concentrated, until it leaves the cartridge, and the apparatus, as concentrated feed (designated by arrows A').

Figure 2:
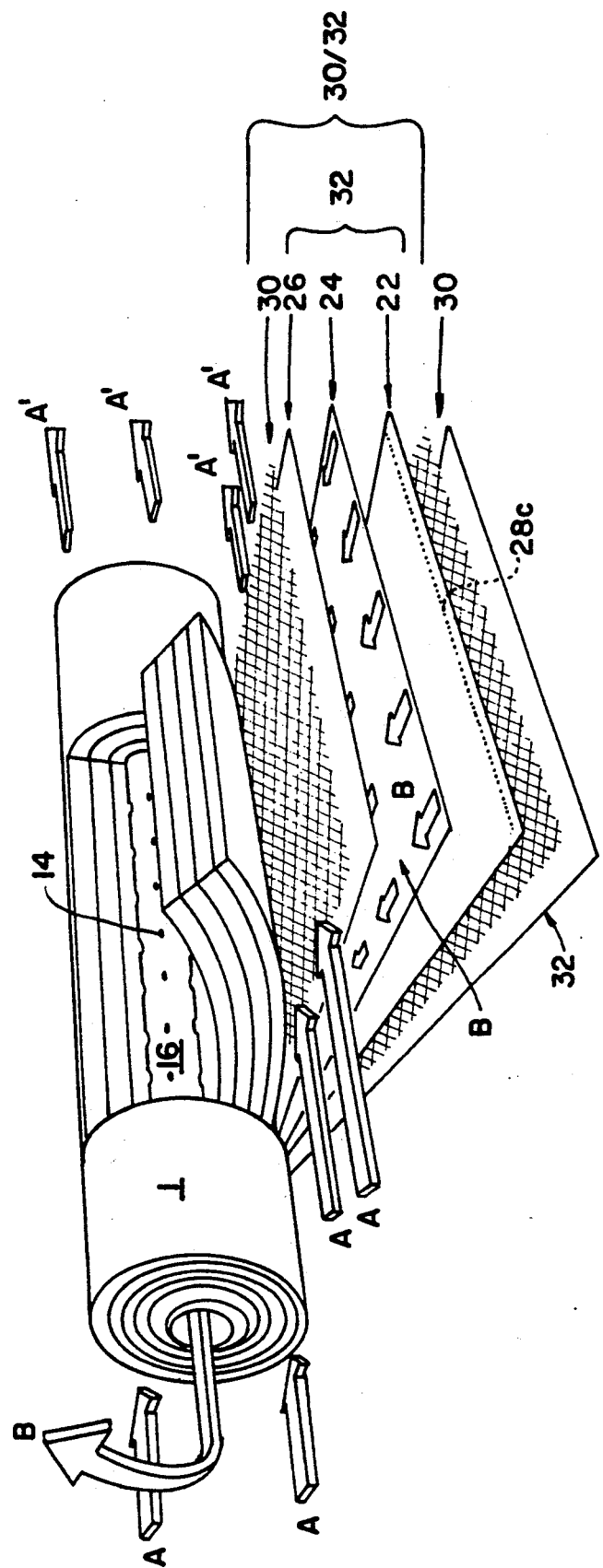
FIG. 2 shows an exploded view of a spiral membrane cartridge according to one embodiment of the invention, showing the path of permeate and retentate through the cartridge.

FIG. 2 shows the fluid flow through the spiral cartridge 1 in further detail. This partially exploded view of the cartridge shows the individual elements of the spiral cartridge. As described above with reference to FIG. 1, feed A flows through the cartridge via feed spacers 30. As the feed flows past membranes 26 and 22 (from A to A'), permeate B travels through either membrane and is carried by the permeate carrier layer 24 to the center of the cartridge, where it flows through apertures 14 into permeate transport tube 16. Permeate B then flows out of the cartridge via the transport tube, while concentrated feed or retentate A' continues through the cartridge and out the opposite end.

Figure 3:
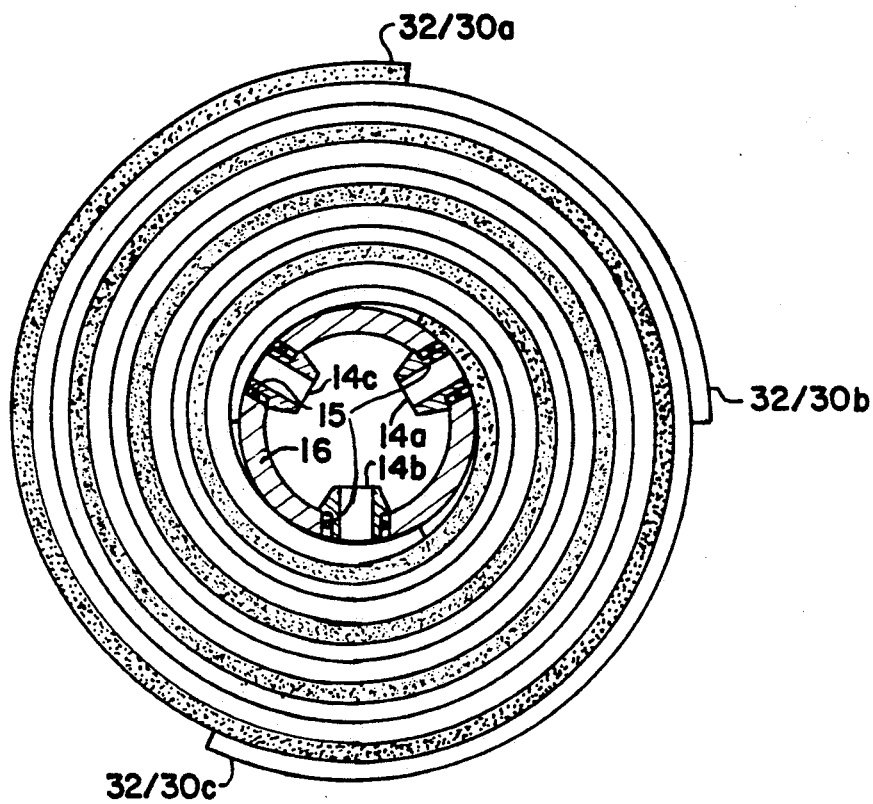
FIG. 3 is a cross-sectional view of the cartridge of FIG. 1, taken radially. Detail 3A is an enlarged view of the seal between the permeate port and permeate transport tube.
Figure 3A:
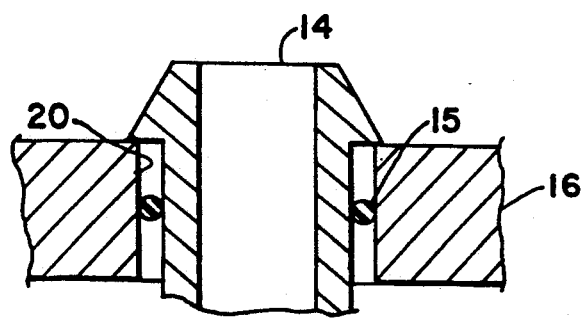

A cross-sectional view of the membrane cartridge of FIG. 2, taken radially (perpendicular to the longitudinal axis), is shown in FIG. 3. The membrane cartridge is comprised of three filter elements 32/30a, b and c, each of which is made up of a membrane element 32 and feed spacer 30. These filter elements are spirally wrapped around cylindrical permeate transport tube 16, and the permeate carrier layer of each is in fluid communication therewith through permeate ports 14a, b and c, respectively. A cylindrical transport tube, i.e. a tube having an outer surface which is circular in cross-section, is used because of its ease of manufacture and desirability as a base for spiral winding. Sealing gasket 15, disposed in the interface between each permeate port and the inner surface of the corresponding aperture in the permeate transport tube, maintains a fluid-tight seal therebetween. Detail 3A shows an exploded view of this seal, which is a "side-seal" formed by the compression of the resilient gasket between the wall of the aperture in the permeate transport tube and the outer wall of the permeate port. The nature of this seal allows it to be maintained without any downward pressure, such that a fluid-tight seal will be formed even if the cartridge is not tightly wound.

Figure 4:
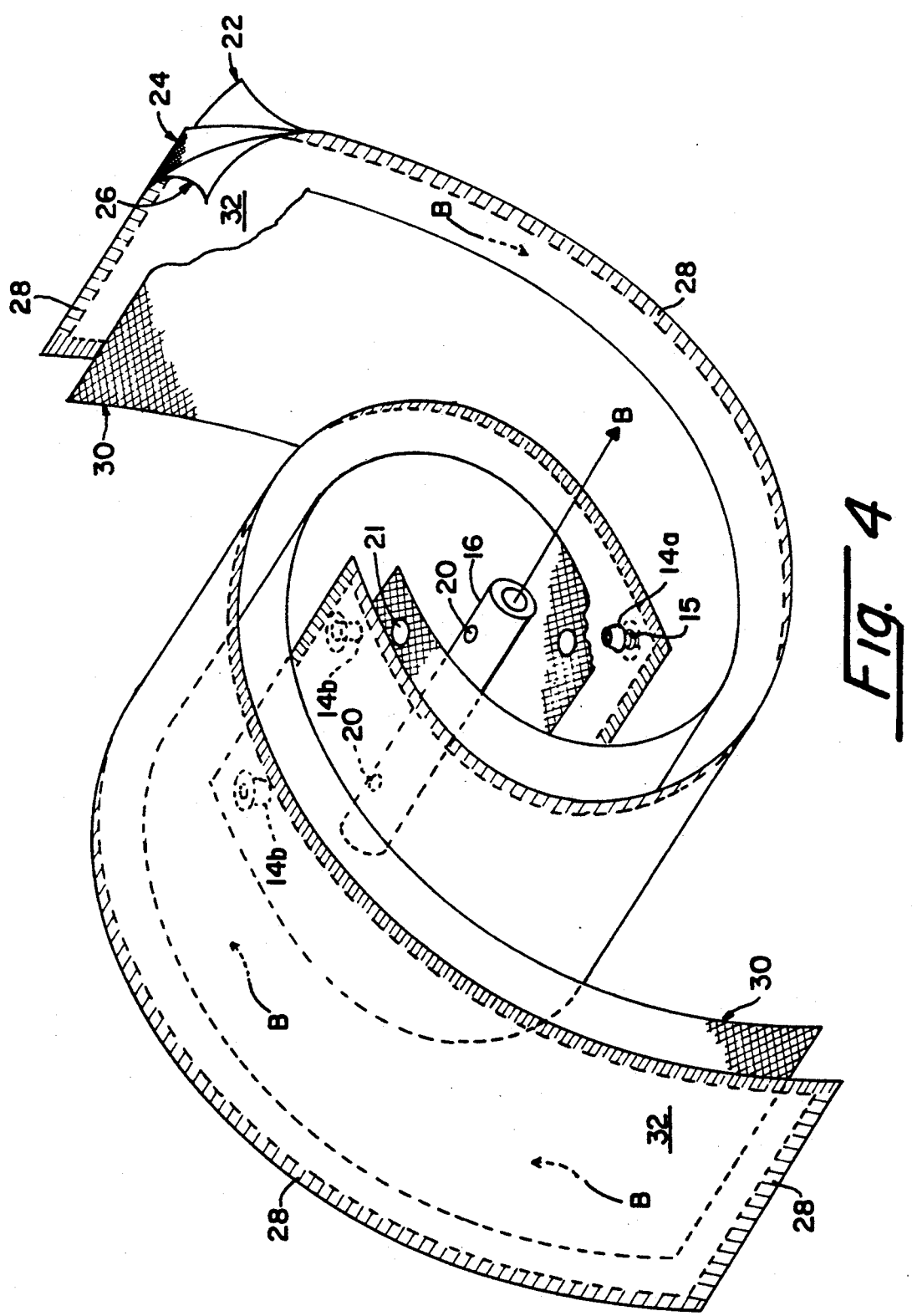
FIG. 4 shows the elements of a spiral membrane cartridge of the invention prior to final assembly of the cartridge.

An exploded view of the cartridge prior to final assembly is shown in FIG. 4. (In this figure only two filter elements are shown, for clarity). When the cartridge is assembled, permeate ports 14a and 14b fit into transport tube apertures 20, providing fluid communication between permeate transport tube 16 and permeate carrier layers 24. Feed spacers 30 are disposed between each membrane element 32 and the permeate transport tube 16, such that each permeate port extends through an aperture 21 in the feed spacer, securing the feed spacer to the transport tube. When the filter elements are spirally wound around the transport tube the flow spacers form an open channel between the individual membrane elements, thereby allowing the process solution (feed) to readily flow through the cartridge. (Permeate flow is again indicated by arrows B).

As seen in FIG. 4, each membrane element 32 is comprised of outer membrane 22, inner membrane 26, and permeate carrier layer 24 disposed therebetween. The entire periphery of each membrane element is heat sealed, forming heat sealed edges 28. Although a membrane element could be formed by folding a single membrane in half and heat sealing the three edges, the membrane element of the invention is formed of two membranes, heat sealed around all four edges, to avoid cracking which may occur when a membrane is folded.

Because each individual membrane element is formed by heat sealing, the need for adhesives is eliminated, and each element may be tested separately before assembly with the other components of the cartridge. Further, the use of separate, heat-sealed membrane elements allows the membrane cartridge assembly to be easily disassembled for repair.

The finished spiral-wound membrane cartridge is produced from the partially assembled structure shown in FIG. 4 by spirally winding the filter elements around the permeate transport tube such that a spiral configuration is obtained, and providing a retaining means, e.g. an outer sleeve disposed around the spiral, in order to maintain the resulting cartridge in the spiral configuration.

The heat-sealed membrane elements of the invention, as described above, are preferably formed by a process comprising the following steps. A first membrane, having a membrane surface and a heat-sealable backing surface with a permeate port heat-sealed thereto, is provided. A second membrane, also having a membrane surface and a heat-sealable backing surface, is provided, and a permeate carrier layer is interposed between the backing surfaces of the first and second membranes. This membrane/carrier assembly is then wound, together with a temporary spacer element, into a spiral having the same diameter as the finished spiral cartridge, i.e. the radius of curvature of the membrane/carrier assembly will be the same as the radius of curvature of the finished membrane element when it is wound in a spiral membrane cartridge with a feed spacer and, optionally, other filter elements. This step allows the assembly to be heat sealed in a curved shape, so that the resulting membrane element can be wound easily without wrinkling, stressing the heat seal, and other problems which would occur if the membrane element were heat sealed flat and subsequently wound.

Next, the edges of the membrane/carrier assembly are temporarily bonded. The spacer element is narrower than the membrane/carrier assembly, leaving a space between windings, such that the windings of the assembly are not bonded together (see FIG. 5, step 110). The temporarily bonded edges are then drawn through a heat-sealing means, e.g. a heater bar, and heat-sealed inside the temporarily bonded edge. After heat-sealing, the temporarily bonded edge is removed, preferably by cutting through a portion of each heat-seal. At some point in the above process, or thereafter before using the element, the two width-wide ends of the membrane element are heat-sealed, such that the periphery of the membranes are completely sealed around the permeate carrier layer.

Figure 5:
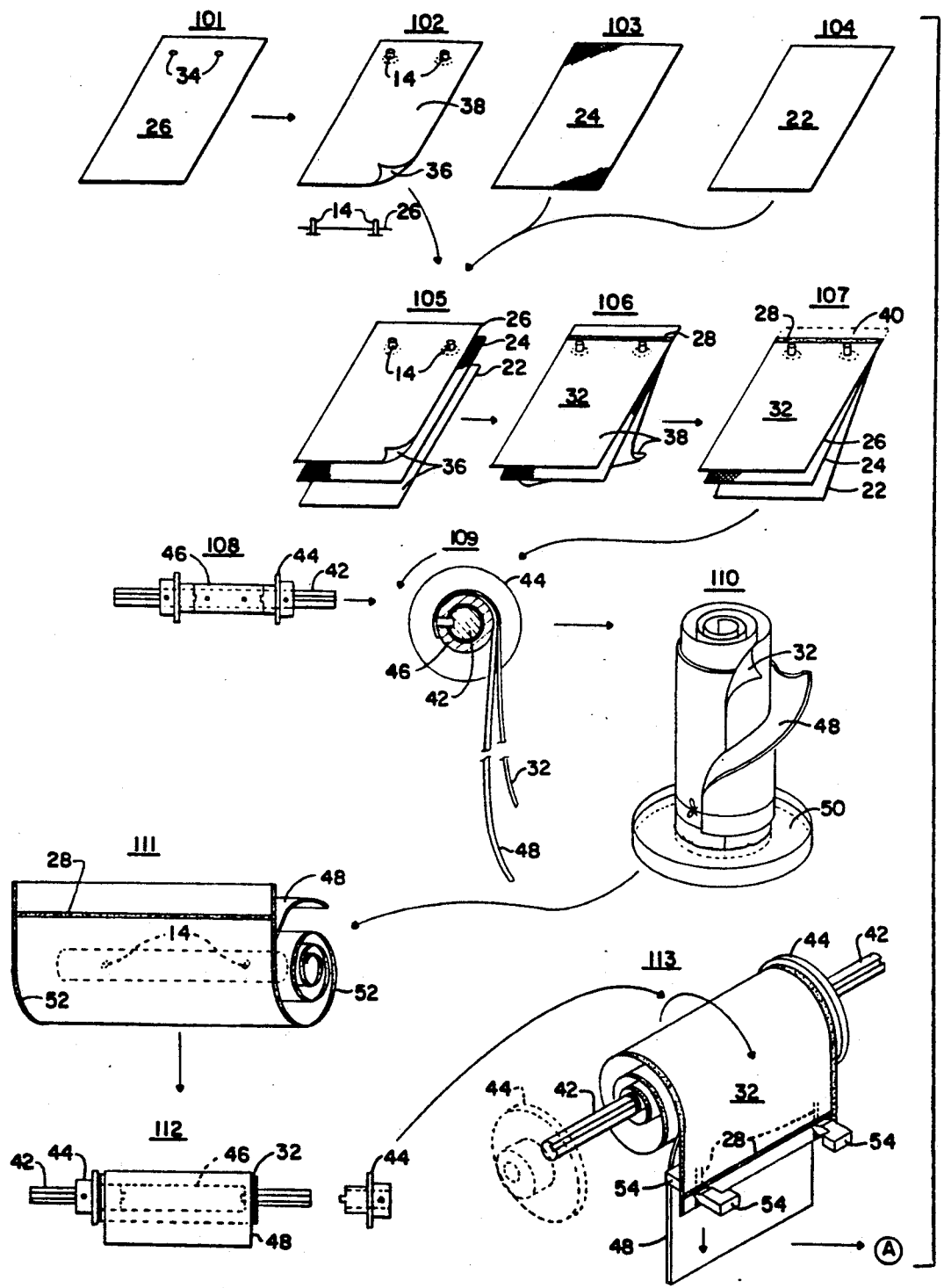
FIGS. 5, and 5A are diagrammatic flowcharts which illustrate a process for forming a filter element according to one embodiment of the invention.

A particularly preferred process for manufacturing a membrane element, and a cartridge of the invention containing the element, is illustrated in FIG. 5. In step 101, first membrane 26 is provided, having surface 38, heat-sealable backing 36 and apertures 34. In step 102, permeate ports 14 are heat sealed through apertures 34, such that each port is sealed to the heat-sealable backing surface 36, and protrudes through the aperture 34 above the membrane surface 38. Permeate carrier layer 24 and second membrane 22 are provided in steps 103 and 104. In step 105, permeate carrier layer 24 is disposed between the membrane backing surfaces 38 of the two membranes, so that the membrane surfaces of the membranes face out and the heat-sealable backings 36 face each other. The thus-formed membrane element 32 is then heat sealed, in step 106, preferably at the edge closest to the ports, forming heat sealed area 28a. In step 107 the area 40 between the heat sealed area and the edge of the assembly is trimmed off close to the heat seal. In step 108 a winding means is provided, preferably comprising mandrel 42, short core 46 and removable extended hubs 44, which contain the membrane in a uniform spiral as it is being wrapped. Membrane element 32 is then attached, along with a temporary spacer element 48, to the short core, and wound in step 109 into a spiral configuration (roll). Temporary spacer element 48, preferably an elastomeric sheet, is provided in order that the membrane element will be wound in a configuration having a radius of curvature identical to the radius of curvature which the membrane element will have in the final cartridge assembly, when it is wound around the permeate transport tube with other membrane elements and accompanying feed spacers.

Figure 5A:
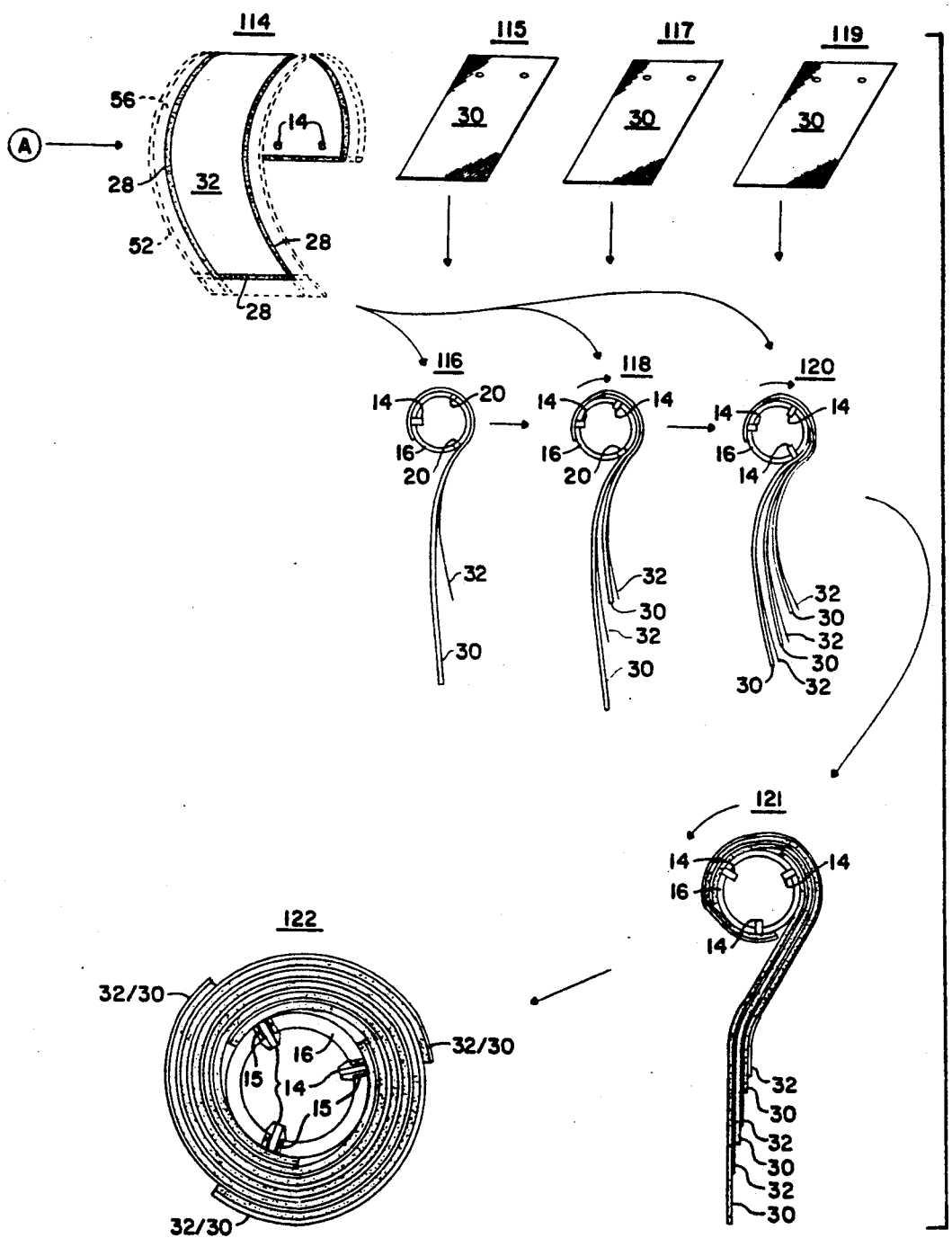

Subsequent to winding, the winding means is removed (e.g., the mandrel and extended hubs are removed, while the short core remains in the spiral), and in step 110 the edges of the membrane element are temporarily bonded, in the illustrated case by dipping one end of the roll in adhesive bath 50, curing the adhesive, and repeating with the other end. Dipping and curing one end at a time is preferred, as the low viscosity adhesive generally runs or wicks into the roll if one end is dipped and the roll is then immediately turned over to dip the other end. Also, so that the spacer element is not dipped into the adhesive and bonded into the roll, it is required that the spacer element be narrower than the membrane element, and centered widthwise such that a gap is formed between the windings of the membrane element at each end of the roll. The gap which is thus formed by the spacer allows the edges of the membrane element to be bonded, without the membrane element being bonded to itself (i.e. so that the membrane element is not retained in the spiral configuration, but can be freely unwound). After removing the wound membrane element from the adhesive bath, it is generally preferred, as shown in step 111, that the end furthest from the permeate ports be heat sealed to form heat sealed area 28b. The membrane element is now bonded/sealed on all sides, i.e. sealed at its ends by heat seals 28a and b and bonded along its lengthwise edges by adhesive bonds 52. In step 112, the winding means, i.e. the mandrel and extended hubs, is reattached to the wound membrane element, and in step 113 the membrane element is sealed by a heating means, in this embodiment by being drawn through four heater bar assemblies 54, to form heat sealed areas 28c and 28d just inside the adhesive bonded edges 52. This heat sealing may be accomplished using any method which provides a complete seal. A preferred method according to the invention is to heat seal a small section at a time, and preferably overlap the heat seals, i.e. back the material up and heat seal over a portion of the area which was just sealed. This is a particularly effective way of providing a smooth seal having the required radius of curvature. It is also preferred that the sealed material be allowed to roll up behind the heating means, as it will tend to do naturally. The membrane element is then removed from the mandrel and the spacer element, and, in step 114, the area 56 between the heat sealed area 28 and the adhesive sealed edge 52 is trimmed off. The edge is preferably trimmed *through* part of the heat seal, so that no unsealed area is left to possibly split or tear. Steps 101–114 are repeated to form as many individual membrane elements as required (three in this embodiment). Each membrane element may also be tested for integrity prior to step 115 (as shown in FIG. 5A). In steps 115, 117 and 119 feed spacers 30 of appropriate lengths are provided. In one embodiment of the invention, one sheet is longer than the others so that it can be wrapped, in the final turn of the winding, around the outside of the cartridge to serve as an outer feed spacer, and optionally to be bonded to itself to serve as the retaining means. In steps 116, 118 and 120 the feed spacers and membrane filter elements are attached to permeate transport tube 16 in the manner described in connection with FIG. 3 above. The permeate transport tube is then rotated such that the elements are spirally wound, as shown in step 121, until the completed spiral assembly shown in step 122 is formed. For best results, the winding tension should be controlled so that it is optimal and is constant from cartridge to cartridge. This may be accomplished using conventional techniques known in the art.

FIGS. 5, and 5A, and the accompanying description, illustrate a preferred method for forming the spiral membrane assembly of the invention. The steps involved in this method may be varied, as long as each membrane element may be heat sealed such that a smooth, fluid-tight seal is formed around all of the element's edges, and the heat seal is formed while the membrane element is maintained in the configuration which it will have when it is wound in the final spiral membrane assembly. For example, rather than dipping the ends of the wound membrane element in adhesive in step 110, the ends could be stitched or otherwise temporarily fastened.

Any desired number of filter elements may be used in forming the spiral membrane assembly. A cartridge having a given outer diameter will have a fixed membrane surface area. The cartridge may comprise either a few long filter elements, or a greater number of shorter filter elements. Which is desired for a given application will be determined by balancing the efficiency obtained with a large number of elements against the cost effectiveness of manufacturing a cartridge having relatively few elements. When a large number of filter elements are used a permeate transport tube having a larger diameter will generally be required. (Alternatively, other means of providing fluid flow between the permeate carrier layer and the permeate transport tube, rather than permeate ports, may be provided).

After the filter elements are spirally wound to form the finished spiral membrane assembly of step 122, the assembly is retained in its spiral configuration by retaining means, e.g. by enveloping it with an outer covering. In the prior art this covering has generally been a plastic tape having a pressure sensitive adhesive on its surface. However, in the present invention the complete elimination of adhesive in the cartridge is desired, so it is preferred that the outer covering be adhesive-free. This may be accomplished in a variety of ways, two of which are the use of an inert shrink wrap tubing, e.g. TEFLON ® polytetrafluoroethylene (PTFE) shrink tubing, or an inert mesh tubing (e.g. a tubing formed of polypropylene mesh). It may also be advantageous, as described hereinabove, to provide one longer feed spacer which, when completely spirally wound, will extend around the outside of the cartridge and may be heat-sealed to itself.

Materials which will be used in the spiral membrane cartridge will be selected by those skilled in the art to suit the particular application in question. It is generally preferred that all materials used in the cartridge be chemically inert and chemically resistant. Other requirements will depend upon the use conditions of the given application.

Preferred membranes for use in the membrane element of the invention include any reverse-osmosis, microporous or ultrafiltration membranes such as polysulfone and other polymer membranes, cellulose acetate membranes, composite membranes and the like. Particularly preferred membranes are polymer membranes having a polyolefin backing. Any membrane may be used however which is suitable for use in spiral membrane applications, provided it can withstand heat sealing temperatures, and has a membrane backing which allows it to be heat sealed. The optimal heat sealing temperature will vary from application to application, depending on the membrane, membrane backing and heater die configuration used.

Materials which are suitable for use as the permeate carrier layer in the membrane element may be of porous felt, weave or fabric material, as well known in the art. Suitable materials include woven and non-woven polymers.

The feed spacer may be formed of any material which will maintain a space between the facing membrane surfaces of the membrane elements such that fluid being pumped through the cartridge, can flow in contact with all membrane surfaces through which permeation occurs. Preferred materials are adequately open, channel-forming grid materials, such as polymeric grid, corrugated or mesh materials. Preferred among these are polypropylene or other polyolefin netting materials, such as those commercially available from Nalle Plastics under the tradename VEXAR ®.

The permeate transport tube may be of any suitable rigid material compatible with the intendedcommercial use. High strength, inert plastics, e.g. polysulfone, polyvinylchloride or polyphenylene oxide, are preferred. The permeate ports may be of a similar material, but are also preferably of a material which is heat-sealable, so that they may be heat-sealed to the membrane.

As described in connection with FIGS. 3 and 4, the permeate ports are attached, preferably by heat sealing, to the membrane backing, and fit sealingly into apertures in the permeate transport tube. It is preferred, as shown in Detail 3A, that a sealing gasket be provided between the permeate port and the permeate transport tube, in order to assure a fluid-tight seal and thus leak-free fluid communication between the permeate carrier layer of the membrane element and the permeate transport tube through the permeate port, thereby avoiding infiltration of the permeate by the feed stream. This feature also obviates the use of adhesive, which was used in the prior art to bond the filter elements to the permeate transport tube.

The foregoing description and accompanying drawings are intended to be illustrative in nature. Other variations and modifications could be practiced by one skilled in the art without departing from the spirit and scope of the invention.

What is claimed is:

1. A spiral wound membrane cartridge comprising:
   a) a cylindrical permeate transport tube having a plurality of axial apertures;
   b) at least one filter element spirally wound around said permeate transport tube, said filter element comprising:
      i) a feed spacer; and
      ii) a membrane element comprising a first membrane having a membrane surface and a heat-sealable backing surface with a permeate port heat sealed thereto, a second membrane having a membrane surface and a heat-sealable backing surface, and a permeate carrier layer interposed between the backing surfaces of the first and second membranes, wherein the membranes are heat sealed together around their entire periphery;
   wherein the filter element is wound around the permeate transport tube such that the permeate port sealingly engages one of the axial apertures therein in order that sealed fluid communication is established between the permeate carrier layer of the membrane element and the permeate transport tube.

2. A membrane cartridge of claim 1 further comprising a retaining means which retains the cartridge in a spiral configuration.

3. A membrane cartridge of claim 2 wherein the retaining means is a PTFE shrink wrap.

4. A membrane cartridge of claim 2 wherein the retaining means is a mesh tubing.

5. A membrane cartridge of claim 1 wherein the membranes are ultrafiltration membranes.

6. A membrane cartridge of claim 1 further comprising a sealing gasket disposed between the permeate port and the permeate transport tube such that a fluid-tight seal is formed.

7. A membrane cartridge of claim 1 comprising from 1 to 12 filter elements.

8. A membrane cartridge of claim 1 wherein the membranes are polymeric membranes having a polyolefin backing.

9. A membrane cartridge of claim 1 wherein the feed spacer is selected from the group consisting of polymeric grid and mesh materials.

10. A membrane cartridge of claim 1 wherein the feed spacer is a plastic netting.

11. A membrane cartridge of claim 10 wherein the plastic netting is a polypropylene netting.

12. A membrane cartridge of claim 1 wherein the permeate carrier layer is a woven or non-woven polymer.

* * * * *